Figure 1:
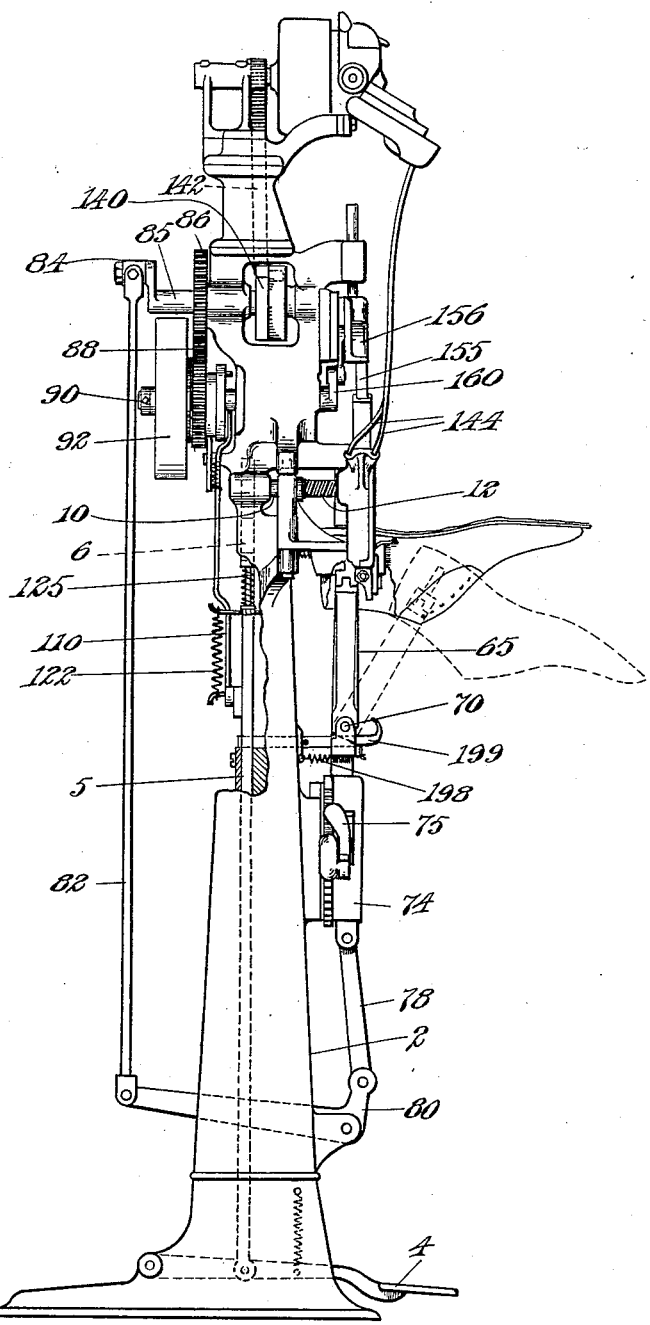

E. L. KEYES.
MACHINE FOR USE IN THE MANUFACTURE OF SHOES.
APPLICATION FILED APR. 30, 1908.
1,023,854.
Patented Apr. 23, 1912.
5 SHEETS—SHEET 2.
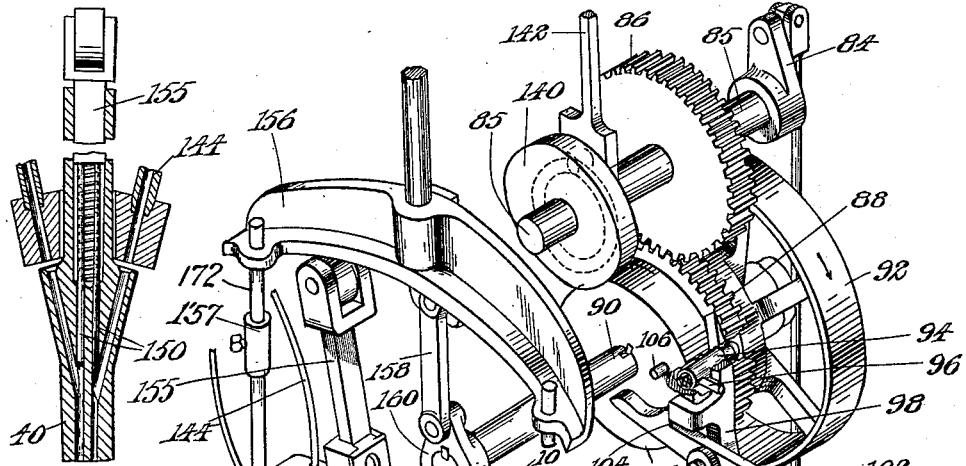
Fig. 3.
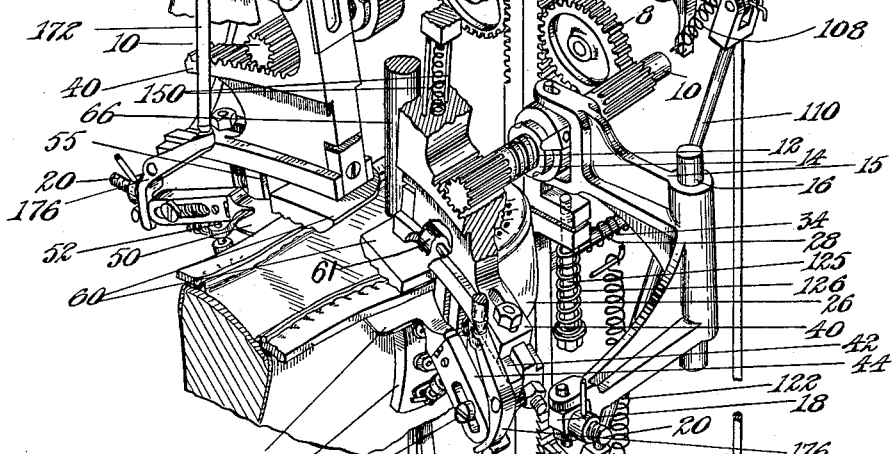
Fig. 2.
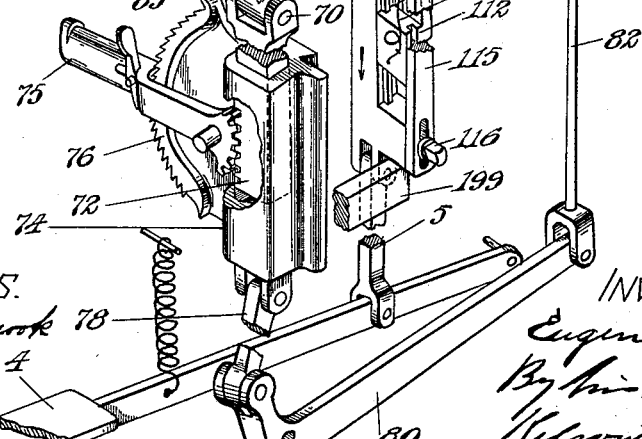
WITNESSES.
Edith C. Holbrook
Elizabeth C. Coupe
INVENTOR.
Eugene L. Keyes
By his Attorney,
Nelson W. Howard
COLUMBIA PLANOGRAPH CO., WASHINGTON, D. C.

E. L. KEYES.
MACHINE FOR USE IN THE MANUFACTURE OF SHOES.
APPLICATION FILED APR. 30, 1908.
1,023,854.
Patented Apr. 23, 1912.
5 SHEETS—SHEET 3.
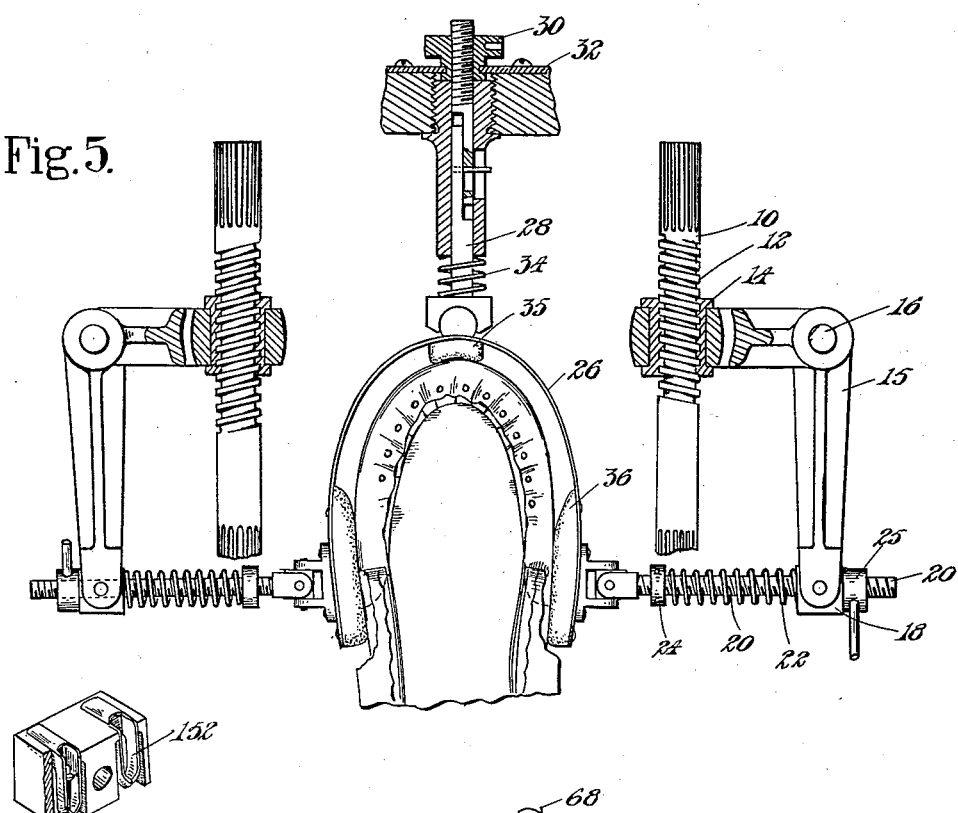
Fig. 5.
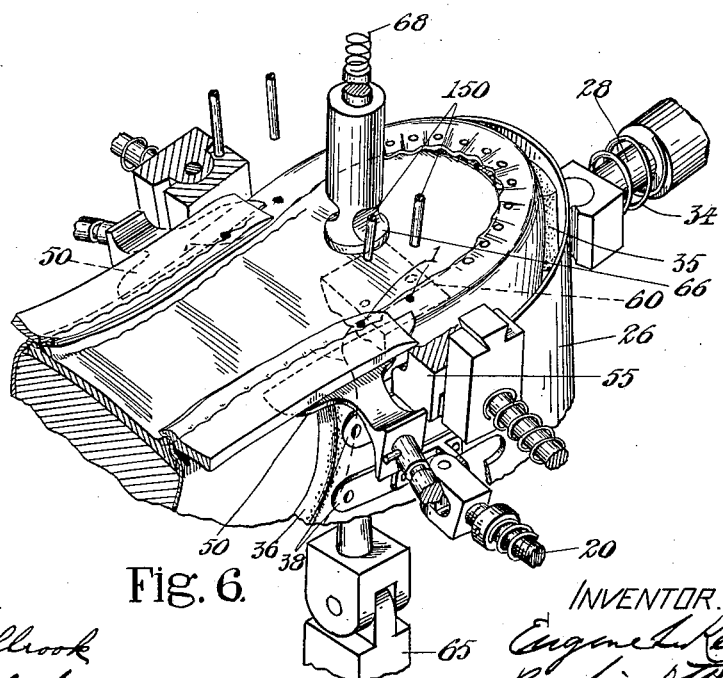
Fig. 4.
Fig. 6.
WITNESSES.
INVENTOR.

E. L. KEYES.
MACHINE FOR USE IN THE MANUFACTURE OF SHOES.
APPLICATION FILED APR. 30, 1908.
1,023,854. Patented Apr. 23, 1912.
5 SHEETS—SHEET 4.
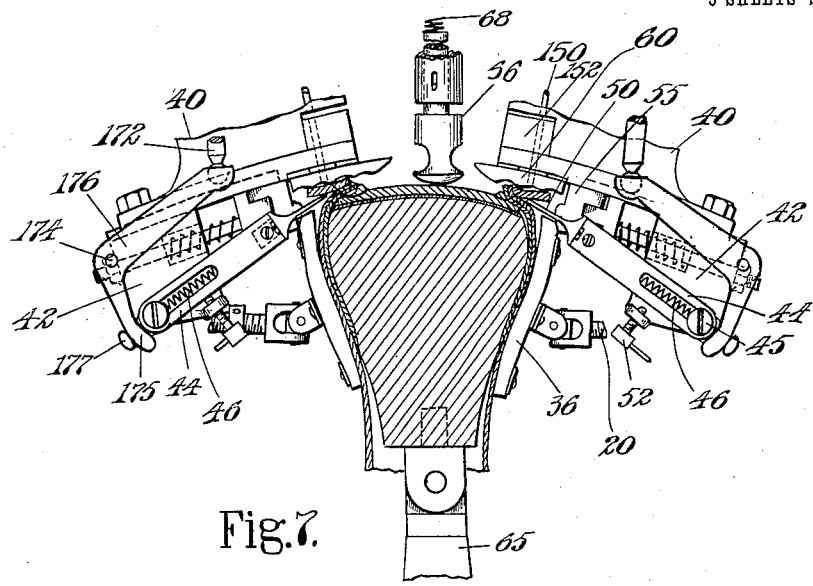
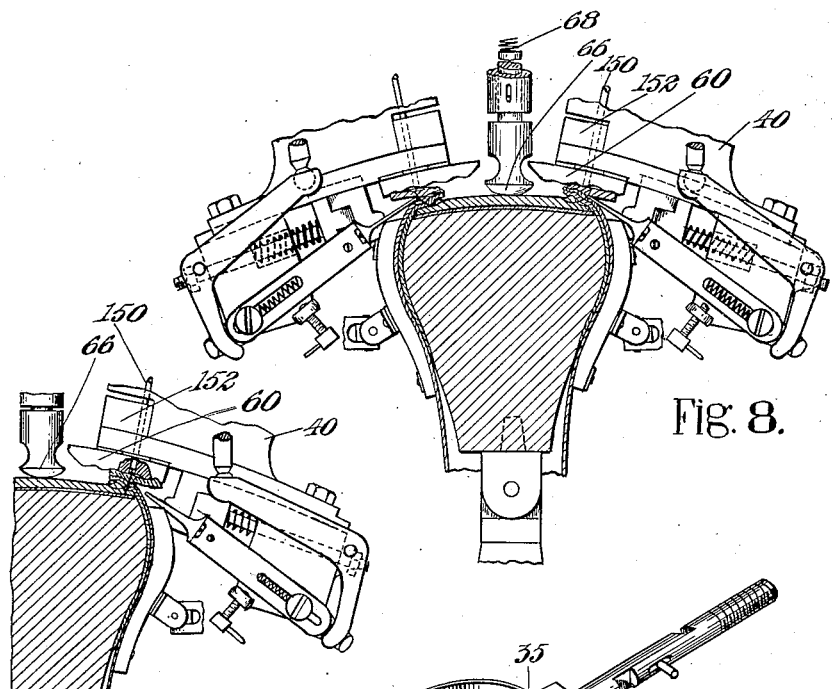
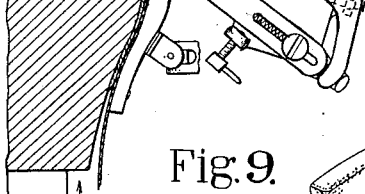
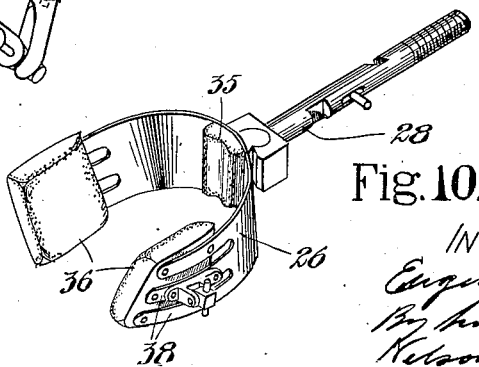
WITNESSES. INVENTOR.

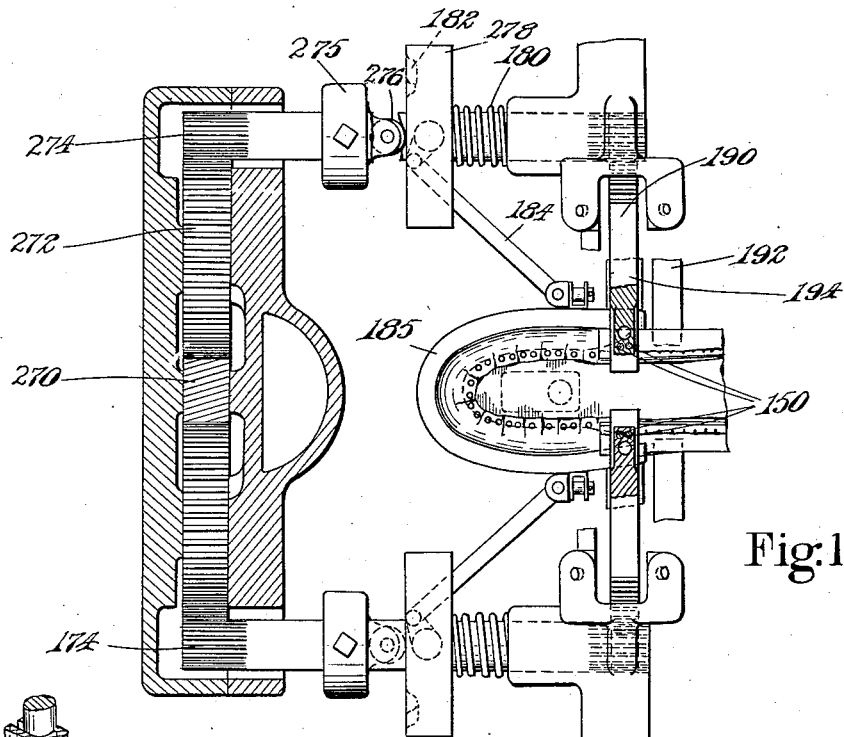

UNITED STATES PATENT OFFICE.

EUGENE L. KEYES, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF SHOES.

1,023,854. Specification of Letters Patent. Patented Apr. 23, 1912.

Application filed April 30, 1908. Serial No. 430,137.

*To all whom it may concern:*

Be it known that I, EUGENE L. KEYES, a citizen of the United States, residing at Boston, in the county of Suffolk and Commonwealth of Massachusetts, have invented certain Improvements in Machines for Use in the Manufacture of Shoes, of which the following description, in connection with the accompanying drawings, is a specification, like reference characters on the drawings indicating like parts in the several figures.

This invention relates to machines for use in the manufacture of boots and shoes and the several features of the invention are herein illustrated, for the purpose of explanation, as embodied in a machine especially adapted for use upon a shoe having an outturned flange. The Goodyear, or "welt," shoe is the most familiar example of this type of shoe and the use of the invention is herein explained in connection with the manufacture of welt shoes.

The general object of the invention is to provide mechanism by which the fitting of the upper materials to the last may be expeditiously effected and particularly to provide a mechanism by which the upper in the portions of the shoe on the sides and bottom of the last at and near the ends of the heel stiffener may be conformed to the last. In making welt shoes the upper, after having been stretched over the last in the lasting operation, is secured to the innersole at the heel seat end of the shoe by fully inserted tacks. At the sides and toe of the shoe the upper is secured by temporary fastenings which are later withdrawn and the upper is permanently fastened by stitches to the usual upstanding lip of the innersole. These stitches also pass through the inner edge of a strip of welting called the "welt" which forms an outturned sole attaching flange of shoe stock at the edge of the shoe. These stitches form the "inseam" of the shoe as distinguished from the outer seam by which the outer sole is later sewed to the welt. In forming the inseam the shoe is positioned by a channel guide that engages the base of the lip on the innersole in advance of the stitch-forming devices. The presence of this guide in advance of the stitch-forming devices prevents the inseam being carried up to the heel seat tacks on the side of the shoe where the inseam is completed and it is also impractical to begin the inseam close to the tacks on the other side. There is usually, therefore, a space at each side of the shoe in which the upper is not secured to the innersole either by the heel seat tacks or by the inseam. This unsecured portion of the upper is located adjacent to the end portions of the heel stiffener which very often spring away from the last and pull the upper outwardly at the unsecured places. It is the practice in the manufacture of many shoes to extend the inseam to include the front end of that portion of the heel stiffener that overlies the last bottom. When this is done, if the stiffener has sprung away from the last, the end portion of the inseam is liable to be further out toward the edge of the last than it should be. In addition to such looseness as that described, which is frequently observable in a shoe after the welting operation, a further looseness is liable to be developed in the heel attaching operation. In this operation the heel portion of the shoe is subject to heavy pressure and if the upper has not been drawn tight and firmly secured prior to this operation it is liable to be bulged outwardly and this detracts from the appearance and the fit of the shoe. These portions of the shoe stock which are located adjacent to the end portions of the heel stiffener, and which seldom, if ever, fit as snugly to the contour of the last as they should do, are forced into position and secured by the illustrated machine embodying this invention. Numerous novel features of the invention are found in the construction and arrangement of the apparatus to adapt it for this purpose. In an earlier application Serial No. 399,529, is shown an apparatus for the same general purpose that is arranged to act upon one side of the shoe at a time.

An important feature of the present invention consists in providing means for operating simultaneously on the two sides of the shoe. The preferred construction is arranged to operate upon a wide range of sizes and shapes of shoes without special adjustments and to this end it comprises upper tightening means movable one toward the other, through distances which may vary according to the size and shape of the last, to force the upper into desired relation.

An important characteristic of the upper tightening mechanism preferably employed is found in an upper engaging member constructed and arranged to engage the side of the shoe progressively from near the quarter and vamp seam upwardly toward the edge of an inverted shoe. This member works any slack stock there may be upwardly while forcing the upper and heel stiffener against and into conformity with the side faces of the last. Said engaging member is preferably employed with other devices that engage the upper and preferably the welt to tighten the upper over the edge of the last and hold it in position to be secured. The use of the engaging member to work the slack toward the edge of the last and clamp the upper and heel stiffener to the wood renders unnecessary any severe straining of the inseam by the devices that engage the welt or inseam and avoids liability of injuring the upper or weakening the inseam.

A further feature of the invention is found in the devices which engage the shoe stock at and adjacent to the inseam to tighten the upper over the edge of the last. These devices, as herein shown, comprise a blade arranged to wipe over the edge of the shoe and enter the crease between the upper and welt where it finds a bearing against the inseam for pressing the shoe stock firmly inwardly over the last bottom. Oppositely arranged blades are located to engage opposed sides of the shoe and they are mounted so that they can yield relatively to adapt themselves to the position of the engaged surfaces and preferably they are supported for a slight turning movement that will enable them to adapt themselves to the slight variations that may be expected in the contour of the engaged surfaces. Manually controlled means is provided by which the presser blades may be advanced repeatedly to work the shoe stock into desired position.

In accordance with a further feature of the invention means is provided which is adapted to engage the upper side of the welt and the inseam and in wiping over the shoe bottom to force the shoe stock inwardly. When employed with the presser blade the wiper holds the welt from upward displacement by the blade which preferably is inclined upwardly to facilitate tightening the upper over the edge of the last.

Another object of this invention is to prepare the surface of the shoe bottom for the reception of the outersole. The welt attaching operation leaves the channel lip, the upper, the edge of the welt and the edge of the heel stiffener upstanding more or less and presenting projections that offer an unsatisfactory seat for the outer sole, especially at that portion that will be covered by the fore part or breast of the heel.

An important feature of this invention consists in shaping the shoe bottom for the reception of the outersole and particularly the shoe stock of that portion of the inseams at and adjacent to the location of the breast line of the shoe. As herein shown the shaping of the shoe bottom is effected by compression, which compacts the several portions of upstanding stock against the innersole and levels the surface to form a firm and even seat for the heel seat end of the sole.

The invention is not, of course, limited to shaping the shoe bottom by compression as the result could of course be accomplished in a more or less satisfactory degree in other ways. Preferably, however, the shaping of the shoe bottom, especially if this is done by compression, will be effected after the upper has been tightened over the edge of the last and while it is held in such condition so that it will be molded into its final position on the shoe bottom. The compression of the stock of the bottom of the shoe is herein shown as effected by raising the shoe support to force the shoe upwardly against the wipers referred to which are moved inwardly over the bottom of the shoe in forcing the upper into tightened relation to the last. To this end the work engaging surfaces of these wipers is extensive enough to cover the portions of the shoe bottom that it is desirable to compress. Preferably the presser blades are withdrawn from the bottom of the welt crease as the pressure is applied so that they offer no obstruction to the compression of the stock.

A further feature of the invention consists in the provision of fastening inserting mechanism constructed and arranged with relation to the other operating devices of the machine to secure the shoe stock while it is held in the position to which it has been forced. This mechanism preferably includes means arranged at each side of the machine and having a movement into an operative position determined by the movement of the stock engaging devices. Provision is made for driving one tack into the butt end portion of the welt and another tack into the upper in the space between the end of the inseam and the row of heel seat tacks.

Another feature of the invention consists in the mechanism employed to actuate the several devices. This mechanism includes manually controlled means by which the several devices for tightening the upper may, without adjustment, be caused to operate in the desired order upon shoes of different sizes and may, if desired, be actuated a plurality of times. When the shoe stock has been satisfactorily manipulated a further movement of the manually controlled means sets into operation power driven mechanism by which the stock is compressed for leveling the shoe bottom and the securing tacks are driven for fastening the stock while it is held in position and while it is under compression.

These and other features of the invention, including numerous details of construction and combinations of parts, will be more fully explained in the following description and then pointed out in the claims.

In the drawings which represent one embodiment of the invention,—Figure 1 is a side elevation of the machine. Fig. 2 is a perspective view with parts broken away and showing many of the operating parts of the machine. Figs. 3 and 4 are details of the tacking mechanism. Fig. 5 is a plan view of portions of the machine in the plane of the shoe bottom. Fig. 6 is a perspective view showing further details. Figs. 7, 8 and 9 are end elevations of some of the operating devices in different stages of their operation on a shoe which is shown in section. Fig. 10 is a perspective view of the heel embracing clamp. Figs. 11 and 12 are respectively plan and perspective views of a slightly modified construction and arrangement of parts shown in Figs. 5 and 6. Fig. 13 is a side elevation of the heel spindle adjusting means that is shown in perspective in Fig. 2.

The column 2 of the machine has support for a treadle 4 connected by means of a rod 5 and intermediate devices with rack bars 6. Each of these rack bars actuates a series of devices at one side of the shoe. These devices at the two sides of the shoe are alike and it is, therefore, necessary to describe only one. The bars engage pinions 8 arranged to turn shafts 10 positioned at opposite sides of the machine and each is provided with a screw-threaded portion 12 which receives a sleeve 14 loosely mounted on the inwardly projecting arm of a bell crank 15. The bell crank is arranged to turn about an axis 16 fixed in the head of the column and its forward end is pivotally connected, as shown in Fig. 5, to a sleeve 18 adapted to slide on a rod 20. The bell crank acts through a spring 22 that surrounds the rod and abuts against a collar 24. A stop 25 is threaded on the outer end of the rod 20. By this arrangement the outward movement of the rod is unyieldingly effected and the inward movement is yieldingly effected. The rod is connected at its inner end to a heel embracing band 26 arranged to extend around the heel portion of the shoe and supported at its rear end by a rod 28 that is guided in the frame of the machine. This rod is made in two overlapping sections, as shown in Fig. 5, and extends through a threaded nut 30 mounted between holding plates 32 in the frame so that the rod or its rear section may be adjusted lengthwise. A spring 34 surrounds the front section of the rod between the frame and the heel band and normally holds the band in an advanced position, but permits it to be pressed backwardly. The band is provided at 35 with a shoe engaging pad which with the band constitutes the back stop for the shoe which is to be operated upon in the machine. The band is provided near its front ends with extended pads 36 for engaging the sides of the shoe at and adjacent to the front ends of the heel stiffener. The band is preferably formed as shown in Fig. 10 with its side portions so bent or twisted that the pads 36 engage the shoe first at their lower edges. As the pads are then forced inwardly by their operating devices the line of contact progresses upwardly and the area of engagement spreads toward and preferably substantially to the edge of the shoe, thus gathering up any slackness in the stock on the side of the heel and working it to the edge of the shoe. The front end portions of the band may be formed as shown in Fig. 9 by separate fingers 38 to render these portions of the band more flexible.

The shaft 10 has at its forward end toothed engagement with rack teeth on the sliding carrier 40 which is movable transversely of the machine in suitable guideways formed in the head of the column. The carrier 40 has tongue and groove connection with a block 42 that is arranged for adjustment inwardly and outwardly, and pivotally supports a presser 44 which is slotted, as shown in Fig. 7, to embrace a stud 45 which acts through the spring 46 for yieldingly actuating the presser. This presser is provided at its inner end with a blade 50 which may be formed as shown best in Fig. 6 to engage the shoe stock at and adjacent to the edge of the last and to enter the crease between the upper and the outwardly projecting sole-attaching flange or welt of the shoe. The presser 44 is arranged for pivotal movement about the stud 45 and is supported from below by an adjustable stop 52, while the blade 50 rests upon and is guided by the upper edge of the pad 36 into position to engage the shoe under the welt. The block 42 also preferably supports yielding devices 55 arranged to engage the upper edge portion of the pads 36 for insuring the clamping engagement of the edge portion of the pad with the upper close to the edge of the last, as shown in Fig. 8. The carrier 40 also supports on its lower inner edge a wiper or presser 60 beveled at its front end and preferably corrugated on its lower face and adapted to move inwardly over the welt and the inseam to assist the presser blades 50 in tightening the shoe stock over the edge of the last.

A spindle or rest 65 supports the shoe against an abutment or rest 66 depending from the machine in position to engage the heel portion of the shoe bottom. This abutment may be arranged to yield upwardly against the tension of a moderately stiff spring 68. The spindle is shown as pivoted at 70 to a rack bar 72 and adapted to swing outwardly into the dotted line position shown in Fig. 1 to facilitate the application and removal of the shoe. The rack bar 72 extends through a member 74 guided in the side of the column 2 and is engaged by a toothed lever 75 pivoted to the member 74 by which the spindle and the shoe may be manually uplifted to present the shoe in position to be operated upon after it has been swung from the dotted line position into the full line position shown in Fig. 1. The lever 75 has a pawl for engaging a ratchet 76 to hold the lever in adjusted position. The member 74 has connection through the link 78 with the upwardly projecting arm of a bell crank lever 80, said arm and link forming a toggle.

The bell crank 80 is pivoted to a bracket extending from the column of the machine and at its rear end is connected by a rod 82 with a crank 84 on a shaft 85, which is mounted in suitable bearings in the head of the column and is driven through gears 86 and 88 from the driving shaft 90, on which runs loosely a pulley 92. A clutch bolt 94 extends from a collar 95 fast on the driving shaft through the gear 88 and into the hub of the otherwise loose pulley 92. The clutch bolt has a pin 96 extending through a slot in the collar 95 into position to be engaged by the inclined face of a clutch controlling device 98. This controlling device is pivotally mounted on a stud 99, which also supports a lever 100 that carries a tilting bar 102, having on its inner end a shoulder 104 adapted to be held by the spring 103 in engagement with the device 98 and withdraw that device from the stud 96 when the lever 100 is rocked. The collar 95 has a stud 106 arranged to engage the inner end of the tilting bar 102 after the machine is started and swing the shoulder 104 downwardly away from the controlling device 98 to permit the spring 108 to return said device into position to engage the stud 96 when the driving shaft has completed one revolution. Any other usual form of one revolution clutch mechanism may be substituted for that described.

The lever 100 above referred to as the actuator for the clutch controlling device is connected by a rod 110 to a block 112 arranged for sliding movement in a frame 114, which constitutes one member of the connection between the treadle rod 5 and the rack bars 6 earlier referred to. This frame 114 has the slide bar 115 arranged for endwise adjustment by a screw and slot at 116 and formed at its upper end for engagement with the tails of pawls 118 carried by the block 112. This plate 115 holds the pawls out of engagement with a series of ratchet teeth formed on the frame 114 until the frame has been moved downwardly with relation to the block 112 and to said pawls far enough to release the latter. A spring 120 thereupon throws the pawls into engagement with the ratchet teeth and the frame and the pawls then form a connection between the treadle rod and the clutch rod 110 by which the latter and the clutch is actuated from the treadle. A spring 122 is arranged to sustain the weight of the block 112 and raise it after it has been depressed by the engagement of the pawls with the frame 114. The upper end of the frame 114 is formed with laterally projecting arms yieldingly connected with the rack bars 6 by the rods 125 and springs 126, one only of which is shown in Fig. 2.

The actuation of the driving shaft when the clutch is operated turns the shaft 85 and the crank 84 thereon to communicate motion to the last supporting spindle for raising the shoe against the pressers 60, whereby the shoe stock engaged by said pressers is compressed and leveled down upon the shoe bottom to form a seat for the outersole. The spring 68 permits the abutment or bottom rest 66 to yield during the compressing operation so that the entire compressing force is received by the pressers 60. The shaft 85 carries also a cam 140 for actuating a rod 142 that extends to a tack separating and delivering mechanism supported on the head of the column. This mechanism forms no part of the present invention and may be of any suitable construction adapted to supply a plurality of tacks to the conductors 144 at each operation of the machine. The tack supplying mechanism is timed to deliver the tacks from the conductors when the carrier 40 occupies its retracted position away from the shoe, in which position it stands in the relation to the conductors that is illustrated in Fig. 3. Said carriers 40 are provided, as shown in that figure with two tack passageways leading into the passages through which drivers 150 are movable. These driver passages terminate in tack holders mounted in a block 152 detachably secured to the carrier and shown separately in Fig. 4. The drivers 150 are carried by a bar 155 which is guided in the carrier 40 and provided on its upper end with a roll for making contact with the driving head 156. This driving head is connected by a link 158 with a crank 160 on the shaft 90. This crank is set to actuate the drivers for inserting tacks into shoe stock while the stock is under compression between the last bottom and the pressers 60. The pressers 60 are recessed to permit tacks to be driven through them, as shown in Fig.

6, and will preferably be connected to the carriers 40 as indicated at 61 in Fig. 2 to permit them to rock laterally for adjusting themselves to the surface of the work. This is particularly advantageous when, as shown herein, the wipers engage the beveled butt ends of the welt.

The blade carriers 44 are each connected with a bell crank 176, see Fig. 7, that is pivotally connected at 174 with the block 40 and has a lower arm 175 that engages an extension 177 on the carrier 44. The upper arm of the bell crank is connected to a rod 172 which extends upwardly and is guided in the nailing head 156. A collar 157 is adjustable on the rod and is positioned to be engaged by the nailing head for retracting the presser blades 50 from the welt crease as the shoe is raised to compress the stock against the wipers. The parts are relatively timed so that the blades hold the shoe stock in its tightened condition until sufficient pressure has been applied so that while it is held by the wipers the blades are withdrawn in season to prevent them from constituting an obstruction to the compression of the stock of the inseam.

In Figs. 11 and 12 a modified construction is shown in which a single rack bar 270 engages through teeth on its opposite edges with pinions 272 to turn shafts 274. Each of these shafts is provided with a collar 275 having on its front face near one edge an ear upon which is mounted a roll 276. The shaft 274 also supports a disk 278 that is loose on the shaft and held against the roll 276 by a spring 180. The disk 278 has a depression 182 in the path of the roll 276 and located in suitable angular position so that when the machine comes to rest the roll stands in the recess. The disk 278 is connected by the link 184 to the front end portions of a heel embracing band or clamp 185. This clamp and its actuating mechanism are adapted to serve the purpose of the band 26 and its pads 35 and 36. The front end portion of the shaft 274 is toothed to move the carrier 190, which is provided with a presser blade 192 and a wiper 194, together with tack driver bars 196 constructed and arranged for inserting tacks, substantially as described in connection with the main views.

In the use of the machine a shoe, which may have been previously lasted and welted, may be applied to the spindle 65 as indicated in dotted lines in Fig. 1. The shoe is swung into the full line position, during which movement it is thrust into the heel embracing band and stopped against the yieldingly supported pad 35. The pad together with the band will have been positioned by the adjusting device 30 so that shoes of the average size to be operated upon in a single adjustment of the parts will be stopped with the butt end portions of the welt and the forward portions of the heel stiffener in suitable relation to the pads 36 and the presser blades 50, which relation may be substantially that shown in Fig. 6, it being understood that the pads 36, the presser blades and other devices at the opposite sides of the shoe occupy their separated or retracted positions when the shoe is thrust into the band. The spring 34 permits some variation in the position of the shoe in accordance with the judgment of the operator in order that the shoe may be located correctly with relation to the devices that are to operate upon it. When the shoe has been properly positioned the treadle 4 is depressed and through the rack bars 6 rotates the shafts 10. These shafts through the devices connected with them first move the pads 36 against the sides of the shoe at and adjacent to the end portions of the heel stiffener, clamping the upper and heel stiffener against the sides of the last at and adjacent to the end portions of the stiffener. As the pressure increases the area of contact spreads from the lower edges of the pads upwardly to the edge of the shoe, thus working any slack material toward the edge of the shoe and firmly clamping the shoe stock against the sides of the last. The presser blades are also actuated inwardly to engage the shoe stock in the welt crease, exerting their inward pressure against the upper and the welt and finally against the inseam to force the shoe stock and the inseam inwardly toward the middle of the last, tightening the upper and stiffener over the edge of the last and holding it under tension. The blocks 55 insure the clamping engagement of the upper edge portions of the pads with the shoe stock at the edges of the last at both sides thus coöperating with the presser blades in conforming the stock snugly to the contour of the last. The wipers 60 move inwardly with the presser blades and by the engagement of their roughened surfaces with the upper face of the welt assist in tightening the shoe stock over the edge of the last and holding it in proper relation to the last bottom. The wipers may also position the butt ends of the welt to receive the securing tacks. Both the pads 36 and the presser blades 50 are yieldingly connected with the carrier 40 so that these devices may adapt themselves without adjustment to different sizes or widths of shoes and to the different contours of the right and left sides of a shoe. If desired, the treadle may be moved up and down to press the stock into position by repeated movements of the described devices engaging the shoe. To enable such repeated movement of the treadle to be effected without liability of actuating the clutch a sliding stop 199 may be arranged, as shown in Figs. 1 and 2, to stand normally under the carrier 114 and prevent the treadle being depressed far enough to disturb the clutch. This stop device is arranged to be readily withdrawn against the tension of its spring 198 when the stock has been forced into position to be compressed and secured. A final or further depression of the treadle serves to move downwardly the carrier 114 and when the plate 115 slides off the tails of the pawls 118 the pawls engage the ratchet teeth on the carrier and through the described connections cause the clutch controlling device 98 to be withdrawn from the path of the pin 96, whereupon the clutch bolt is automatically thrown into engagement with the continuously rotating pulley 92 and the shafts 90 and 85 are caused to make one complete revolution and are then arrested by the clutch controlling device. In this rotation of the shafts the crank 84 effects the elevation of the heel spindle, thus forcing the shoe upwardly against the wipers 60 and compressing the stock covered by the wipers against the bottom face of the last. While the stock is held under compression the crank 160 effects the driving of the tacks which may be inserted in the relation to the shoe indicated at 1 in Fig. 6, or in any other suitable relation. It will be noted that the wipers act at and adjacent to the location of the heel breast. By compressing this stock a firm seat is made for the heel, and the securing tacks, which are driven while the stock is so held, and prevent it from being forced outwardly by the compression which is incident to the heel attaching operation. During the power actuation of the machine the tack supplying devices are operated to separate tacks and to deliver them through the conductors 124 to the tack blocks 152 when the carriers 40 reach their outermost position. The yielding connections 125, 126 between the treadle and the rack bars 6 permit the final depression of the treadle for operating the clutch. It will be understood, however, that in this further depression of the treadle the springs 126 exert a final pull upon the rack bars, tending to force the wipers 60 inwardly over the shoe bottom while the shoe is being lifted against these wipers by the mechanism actuated from the clutch. The compression of the shoe stock is therefore effected by a relative movement of the last and pressers vertically and also a movement of the pressers inwardly so that a pressure oblique to the last bottom and inclined inwardly is effected just before the tacks are driven.

The tacking mechanism is preferably arranged as may be seen in Fig. 7 to drive the tacks in a direction inclined slightly inwardly so that if the tacks are long enough to extend through the innersole their points will strike obliquely against the usual iron plate on the bottom of the heel portion of the last and be clenched inwardly instead of outwardly. This provision avoids the liability of the tacks being turned outwardly where they might project into the upper and it also insures that the tacks shall have a drawing tendency to force the upper still more tightly into the last.

Having explained the nature of this invention and described a preferred construction embodying the same, I claim as new and desire to secure by Letters Patent of the United States:—

1. A machine for working the upper into lasted position adjacent to the ends of the heel stiffener of a shoe having an outturned flange, comprising means constructed and arranged to engage the shoe stock at opposed sides of the shoe locally at or near the ends of said stiffener and tighten the upper over the edge of the last, and mechanism for fastening the upper.

2. A machine for working the upper into lasted position adjacent to the ends of the heel stiffener of a shoe having an outturned flange, comprising means constructed and arranged to engage the shoe stock at opposed sides of the shoe and force the upper over the last bottom simultaneously at the two sides, and mechanism operatively connected with said means for inserting fastenings in position to hold the upper.

3. A machine for working the upper into lasted position adjacent to the ends of the heel stiffener of a shoe having an outturned flange, comprising means constructed and arranged to engage the shoe stock at opposed sides of the shoe and tighten the upper about the last, and automatically operated mechanism for inserting fastenings at the opposite sides of the shoe to secure the upper while it is held in tightened relation to the last.

4. A machine for working the upper into lasted position adjacent to the ends of the heel stiffener of a shoe having an outturned flange, comprising devices constructed and arranged to engage the shoe stock and force the upper inwardly and upwardly over the edge of the last at the two sides of the shoe and to hold the upper under tension, and mechanism operating automatically to drive fastenings simultaneously for securing the upper at the two sides of the shoe.

5. A machine for working the upper into lasted position adjacent to the ends of the heel stiffener of a shoe having an outturned flange, comprising devices constructed and arranged to engage the flange at opposite sides of the shoe and tighten the upper over the edge of the last, and mechanism operating automatically to secure the upper while it is held tight at the two sides of the last.

6. A machine for tightening the upper of a welt shoe adjacent to the ends of the heel stiffener, having means for engaging the butt end portions of the welt at opposite sides of the shoe and pressing the welt inwardly over the shoe bottom, and means for securing the end portions of the welt while they are held pressed inwardly.

7. In a machine of the class described, manually controlled means including devices constructed and arranged to engage a lasted welt shoe below the welt for tightening the upper over a last at opposed sides of the last simultaneously, and automatic mechanism for inserting fastenings to hold the upper at the two sides of the last.

8. In a machine of the class dscribed, means constructed and arranged to tighten the upper over a last at points adjacent to the two ends of the heel stiffeners simultaneously, and automatic mechanism for inserting fastenings to hold the upper at the two sides of the last combined with means to sustain the shoe for the action of the tightening devices in a predetermined plane relatively to the shoe bottom and to support the shoe substantially unyieldingly against the impact of the fastening inserting mechanism.

9. In a machine of the class described, manually controlled means including devices constructed and arranged to engage a lasted welt shoe below the welt for tightening the upper over a last at opposed sides of the last simultaneously and connected mechanism for inserting fastenings automatically when a predetermined force has been applied to tighten the upper.

10. A machine for tightening the upper of a welted shoe adjacent to the ends of the heel stiffener, having means for engaging the shoe stock in the welt crease, actuating means therefor under control of the operator, and automatically driven means for inserting fastenings to secure the upper.

11. A machine for tightening the upper of a welted shoe adjacent to the ends of the heel stiffener, having means for engaging the shoe stock in the welt crease, actuating means therefor under control of the operator, and automatically driven means for compressing the stock upon the last bottom.

12. A machine for t ightening the upper of a welted shoe adjacent to the ends of the heel stiffener, having means for engaging the shoe stock to force the upper over the edge of the last at the two sides of the shoe, said means having provision for controlling the position of the butt ends of the welt, and means for securing the upper.

13. A machine for tightening the upper of a welted shoe adjacent to the end of the welt, having means for entering the welt crease, means for engaging the opposed side of the welt, and mechanism for actuating said two means to press the welt and the attached upper inwardly over the edge of the last.

14. A machine for tightening the upper of a welted shoe adjacent to the ends of the welt, having means for engaging the opposed sides of the rear end portion of the welt, mechanism for actuating the engaging means inwardly relatively to the shoe bottom to tighten the upper attached to the welt, and means for inserting fastenings in position to secure the upper.

15. A machine for tightening the upper of a welted shoe adjacent to the ends of the welt, having means arranged at opposite sides of the shoe for entering the welt crease, means for engaging the upper side of the welt, and actuating mechanism for causing the upper to be forced inwardly at the two sides of the shoe at the same time.

16. A machine for tightening the upper of a welted shoe adjacent to the ends of the welt, having means arranged at opposite sides of the shoe for entering the welt crease, means for engaging the upper side of the welt, mechanism for actuating said means to force the upper at the two sides of the shoe inwardly at the same time and hold it, and mechanism for fastening the upper while it is so held.

17. A machine for use in making shoes having manually controlled means for engaging shoe stock in the welt crease on opposed sides of the shoe and forcing it inwardly over the edge of a last, fastening inserting means movable inwardly with said engaging means, and power driven means for causing the insertion of fastenings after the upper has been tightened.

18. A machine for use in making shoes, having means for engaging shoe stock on opposed sides of the shoe and forcing it inwardly over the edge of a last, fastening inserting means movable inwardly with said engaging means, and connected mechanism under control of the operator for effecting and controlling the inward movement of the engaging means and for starting the power driven means.

19. A machine for tightening the upper of a welted shoe adjacent to the ends of a welt, having means constructed and arranged for movement to engage the shoe stock on opposed sides of the shoe and to adapt themselves automatically to the size and shape of the shoe, and actuating mechanism therefor to cause the upper to be forced over the edge of the last and held in position to be secured.

20. A machine for tightening the upper into lasted position adjacent to the ends of the heel stiffener of a shoe having an outturned flange, comprising means constructed and arranged to engage the flange at opposite sides of the shoe and to adapt themselves automatically to the size and shape of the shoe, actuating mechanism therefor, and fastening inserting means movable with said engaging means into inserting relation to the tightened upper.

21. A machine for tightening the upper adjacent to the ends of the heel stiffener of a shoe having an outturned flange, comprising means for positioning the shoe, devices constructed and arranged to engage the flange at opposite sides of the shoe, means for actuating the engaging devices inwardly and also upwardly to strain the upper, and means for inserting fastenings to secure the upper at the two sides of the shoe.

22. A machine for tightening the upper adjacent to the ends of the heel stiffener of a shoe having an outturned flange, comprising means for supporting the shoe, devices constructed and arranged to engage the shoe stock at opposite sides of the shoe for forcing the upper inwardly over the edge of the last, and means for effecting vertical compression of the heel seat end portion of the shoe bottom.

23. A machine for tightening the upper of a welted shoe into lasted position adjacent to the rear end of the inseam, comprising means for engaging the shoe stock to force the upper over the edge of the last, and means for compressing the stock at the rear end of the inseam to shape the heel seat end of the shoe bottom.

24. A machine for use in making shoes, comprising means constructed and arranged to tighten an upper over a last edge adjacent to the end of the heel stiffener, and means for leveling that portion of the bottom of the lasted shoe over which the breast portion of the heel is to be applied.

25. A machine for use in making shoes, comprising means constructed and arranged to tighten an upper over a last edge adjacent to the two ends of the heel stiffener, and means for leveling the heel seat portion of the shoe bottom while the upper is held tightened.

26. A machine for use in making shoes, comprising means constructed and arranged to tighten an upper over a last adjacent to the end of the heel stiffener, means for effecting compression of the shoe in a direction perpendicular to the bottom thereof and in the region over which the breast portion of the heel is applied, and means for inserting a fastening to secure the upper.

27. A machine for tightening the upper of a welted shoe into lasted position adjacent to the rear ends of the inseam, comprising means for engaging the shoe stock to force the upper over the edge of the last, means for leveling the rear end portion of the inseam while the upper is held, and means for securing the upper.

28. A machine for use in making shoes, having means for engaging the upper adjacent to the ends of the heel stiffener to tighten it over the last, means for overlaying the shoe bottom adjacent to the ends of the stiffener, means for relatively moving said latter means and the shoe to effect compression of the stock of the shoe bottom, and means for inserting fastenings to secure the upper.

29. A machine for use in making shoes having an outturned flange, comprising means for engaging the upper under the flange and means for engaging the upper side of the flange whereby the upper may be forced upwardly and inwardly to tighten it about the last, and means for relatively moving said last-named engaging means and the last to compact the upper on the last bottom.

30. A machine for use in making shoes having an outturned flange, comprising means for engaging the upper under the flange at either side of the shoe, means arranged to extend over the flange, means for relatively moving the shoe and the engaging means to tighten the upper, and means for relatively moving the shoe and the means extending over the flange to compress the stock on the shoe bottom.

31. A machine for use in making shoes having an outturned flange, comprising devices arranged at either side of the shoe to extend under the flange, coöperating devices to extend over the flange and inwardly over the shoe bottom, means for actuating said devices to press and wipe the shoe stock inwardly from opposite sides of the shoe simultaneously, and means for relatively moving the shoe and said devices to compress the stock of the shoe bottom vertically.

32. A machine for use in making shoes having an out-turned flange, comprising devices arranged at either side of the shoe to extend under the flange, coöperating devices to extend over the flange and inwardly over the shoe bottom, means for actuating said devices to press and wipe the shoe stock inwardly from opposite sides of the shoe simultaneously, means for relatively moving the shoe and said devices to compress the stock of the shoe bottom vertically, and means for fastening the upper in its inwardly pressed position while it is held by said devices.

33. In a machine for use in making shoes, means constructed and arranged to engage a shoe in the welt crease for tightening an upper over the edge of a last adjacent to the end of the heel stiffener, combined with automatically operated mechanism for compressing the stock of the shoe bottom in the direction of its thickness and securing the upper in its tightened relation to the last.

34. In a machine for use in making shoes, means for tightening an upper over the edge of a last adjacent to the ends of the heel stiffener simultaneously at the opposite sides of the last, combined with automatically operating mechanism for leveling the shoe bottom and fastening the upper in its tightened relation to the last.

35. A machine for use in making shoes, comprising a shoe support, a presser for engaging the side of the shoe, a wiper to extend over the shoe bottom, and automatically operated mechanism for compressing the overworked marginal portion of the upper and the innersole of the shoe between said support and wiper and for driving tacks.

36. A machine for use in making shoes, comprising a shoe support, pressers arranged to engage each side of the shoe adjacent to the ends of the heel stiffener, wipers to extend over the shoe bottom, actuating mechanism to cause said devices to tighten the upper, and automatically operated mechanism for compressing the stock of the shoe bottom.

37. A machine for use in making shoes, comprising a shoe support, pressers arranged to engage each side of the shoe adjacent to the ends of the heel stiffener, wipers to extend over the shoe bottom, actuating mechanism to cause said devices to tighten the upper, and automatically operated mechanism for compressing the stock of the shoe bottom and inserting a plurality of fastenings through the compressed stock simultaneously.

38. A machine for use in making shoes, comprising means for engaging the shoe stock at opposite sides of a lasted shoe adjacent to the ends of the heel stiffener and tightening it over the last bottom, and means for driving fastenings simultaneously at the two sides of the shoe in directions to cause the tacks to exert an inward draft on the upper and to clench away from the edge of the shoe.

39. A machine for use in making shoes, comprising means for forcing inwardly the upper on a shoe bottom from opposite sides of the shoe simultaneously, and means operated automatically to compact the upper on the shoe bottom and drive fastenings simultaneously in directions inclined inwardly from the two sides of the shoe.

40. A machine for use in making shoes, comprising means arranged to engage the side of the shoe adjacent to the end of the heel stiffener, actuating means for causing the area of engagement to spread toward the edge of the last whereby the upper is worked upwardly on an inverted last, means for forcing the upper over the edge of the last, and means for securing the upper upon the shoe bottom.

41. A machine for use in making shoes, comprising means arranged to engage the side of the shoe adjacent to the end of the heel stiffener, actuating means for causing the area of engagement to spread toward the edge of the last whereby the upper is worked upwardly on an inverted last, means for forcing the upper over the edge of the last, means operated automatically to compress the stock of the shoe bottom, and means for securing the upper.

42. A machine for use in making shoes, comprising means arranged to engage the side of the shoe adjacent to the ends of the heel stiffener, actuating means for causing the contact of said engaging means with the upper to progress toward the edge of the last on the two sides of the shoe simultaneously, means for working the upper over the edge of the last, and means operated automatically for shaping the stock on the last bottom to form a seat for the outersole.

43. In a machine for use in making shoes, connected mechanism for tightening an upper of a lasted and welted shoe over the edge of the last, compressing the stock of the shoe bottom and fastening the upper.

44. A machine for use in making a shoe having an outturned flange, comprising connected mechanism for engaging the shoe stock at the flange to tighten the upper over the edge of the last, compressing the shoe stock on the last bottom, and fastening the upper.

45. A machine for use in making a shoe having an outturned flange, comprising connected mechanism for engaging the shoe stock at the flange on the two sides of the shoe to tighten the upper over the opposite edges of the last simultaneously and for inserting fastenings to secure the upper.

46. In a machine for use in making shoes, connected mechanism constructed and arranged to engage the shoe stock adjacent to the ends of the heel stiffener on opposite sides of the shoe simultaneously to tighten the upper over the edge of the last, to compress the shoe stock for forming a seat for the outersole, and to insert fastenings at the two sides of the shoe at the same time for securing the upper.

47. A machine for use in making shoes, comprising plates arranged for movement inwardly over the end portions of the inseam and heel stiffener, and automatically operated mechanism for effecting compression of the portion of the shoe bottom covered by said plates and for inserting tacks in the shoe bottom.

48. A machine for use in making shoes, comprising means arranged for movement inwardly over the end portion of the inseam and heel stiffener, mechanism for effecting relative movement of said means and the shoe to compact the inseam and heel stiffener against the innersole, and means for inserting fastenings into the shoe stock while it is held under compression.

49. In a machine of the class described, a resilient heel embracing band having its end portions split lengthwise to form separate tongues and a pad supported by and bridging said tongues at each end of the band.

50. In a machine of the class described, a resilient heel embracing band formed to present normally the lower edges of its opposite end portions nearer together than its upper edges, pads secured to said end portions, and actuating means constructed and arranged relatively to the band to close the lower edge portions of the pads first against the shoe and then bend the band to cause the points of engagement to progress toward the upper edges of the pads.

51. In a machine of the class described, a resilient heel embracing band formed to present normally the lower edges of its opposite end portions nearer together than its upper edges, pads secured to said end portions, means for closing the pads against the shoe, and other means for forcing inwardly the upper edges of the pads to clamp the edges of the shoe.

52. In a machine of the class described, a resilient heel embracing band and actuating mechanism therefor, including relatively yielding devices respectively connected with the body of the band adjacent to the end portions and operatively engaged with the upper edge of the band.

53. In a machine of the class described, a resilient heel embracing band and actuating mechanism therefor, including relatively yielding devices respectively connected with the body of the band adjacent to the end portions and operatively engaged with the upper edge of the band, said machine having provision for causing the upper edges of the band to be forced into clamping position after the body of the band.

54. A machine of the class described, having a wiper arranged for movement over the shoe bottom, a presser arranged to engage the shoe stock in the welt crease and inclined upwardly toward the wiper, combined with suitable actuating means.

55. A machine of the class described, having a wiper arranged for movement over the shoe bottom, a presser arranged to engage the shoe stock in the welt crease and inclined upwardly toward the wiper, and means for actuating the wiper inwardly over the shoe bottom while yieldingly actuating the presser inwardly and upwardly against the inseam in the welt crease.

56. A machine of the class described, having a wiper to engage the shoe stock on the last bottom, a presser to engage the shoe stock in the welt crease, and means for clamping the shoe stock to the side of the last at and adjacent to its edge.

57. A machine of the class described having, in combination, the wide thin edged blade 50 mounted for engagement in the welt crease at the rear of the shank of a welted shoe to tighten the upper materials at the end of the inseam and hold them while they are being fastened, and a support upon which said blade is mounted for limited rotary movement about an axis that is substantially perpendicular to the side face of the shoe to permit the blade to adapt itself to the spring of the shoe edge.

58. A machine of the class described, having means for gathering slack from the side of the shoe and forcing it to the edge of the last at the opposite sides of the shoe, means for engaging the shoe stock at the ends of the inseam to tighten it over the last, and means for fastening the upper while it is held.

59. A machine of the class described, having means engaging the shoe stock at the inseam to tighten it over the edge of a last, means for effecting compression of the shoe stock against the last bottom, and means for inserting tacks while the upper is under compression.

60. In a machine of the class described, a heel embracing band constructed and arranged to clamp the shoe stock to the last at and adjacent to the ends of the heel stiffener, means arranged at opposite sides of the last to wipe the correspondingly located portions of the shoe stock over the last bottom, and connected operating mechanism for said two seams.

61. In a machine of the class described, a heel embracing band constructed and arranged to clamp the shoe stock to the last at and adjacent to the ends of the heel stiffener, means arranged at opposite sides of the heel of a last to force correspondingly located portions of the shoe stock over the edge of the last, means for inserting tacks to secure the upper, and connected mechanism for actuating said two means constructed and arranged to allow the operator to inspect the work before the tacks are driven.

62. In a machine of the class described, means arranged at opposite sides of a last to force correspondingly located portions of the shoe stock over the edge of the last, means for inserting tacks to secure the upper, and connected mechanism for actuating said two means constructed and arranged to permit a plurality of partial operations of the machine for forcing the upper into position before the tack inserting devices are actuated.

63. In a machine of the class described, means arranged at opposite sides of a last to force correspondingly located portions of the shoe stock over the edge of the last, means for inserting tacks to secure the upper, and mechanism for actuating said two means constructed and arranged to permit the upper manipulating means to be operated without necessarily actuating the tack inserting means.

64. A machine of the class described, having a presser to engage a shoe in the welt crease, a wiper to engage the opposed side of the welt, and means for actuating the presser and wiper to force the upper over the last.

65. In a machine of the class described, a resilient heel embracing band, a pad carried by each end of the band and arranged to engage the side of the shoe at and adjacent to the front end portion of the heel stiffener, means for actuating the band to cause the pads to clamp the shoe stock against the side of the last, and other means for actuating the pad to clamp the shoe stock against the edge of the last.

66. In a machine of the class described, a heel embracing band, and means for supporting the band, comprising the rod 28 having two relatively movable parts, the spring for pressing the band forwardly, and means for adjusting the rear part for the purpose described.

67. In a machine of the class described, a back gage comprising an abutment, a carrier therefor, having two sections constructed and arranged to permit a limited amount of relative endwise movement, a spring for holding the abutment carrying section projected to the limit of said relative movement, a support, and means arranged to permit adjustment of the other section in the support.

68. In a machine of the class described, a heel embracing band and operating mechanism therefor, comprising an actuator, the bell cranks 15 having yielding connection with the end portions of the band, and connections including the screw-threaded shafts 10 with the actuator.

69. In a machine of the class described, a heel embracing band, a tacking mechanism, a treadle, a connection from the treadle to the band to cause the latter to clamp the upper to the last, and a connection to the tacking mechanism to cause the latter to be operated for forcing the upper over the last bottom and securing it.

70. A machine of the class described, having wipers arranged for movement from opposite sides of the heel over the last bottom, means for effecting vertical compression of the shoe stock between the wipers and the last bottom, and power driven means for inserting tacks.

71. A machine of the class described, having wipers arranged for movement from opposite sides of the heel over the last bottom, means for effecting vertical compression of the shoe stock between the wipers and the last bottom, and power driven means for inserting tacks, said machine having provision for permitting repeated movements of the wipers without necessarily actuating the tack inserting means.

72. A machine of the class described, having wipers arranged for movement from opposite sides of the heel over the last bottom, and means for effecting vertical compression of the shoe stock between the wipers and the last bottom, said machine having provision for pressing the wipers inwardly during said vertical compression.

73. A machine of the class described, having unyielding wipers arranged for movement from opposite sides of the heel over the last bottom, and connected mechanism for simultaneously raising the shoe against the wipers and pressing the wipers inwardly.

74. A machine of the class described, having means for tightening the shoe stock over the last bottom at and adjacent to the two end portions of the heel stiffener simultaneously, means for compressing the shoe stock against the last bottom at and adjacent to the location of the heel breast, and means for securing the stock while it is under compression.

75. A machine for use in making shoes, having means for tightening the shoe stock over the bottom of a lasted shoe, means for determining the position of the shoe longitudinally in the machine, and automatically driven mechanism for compressing and securing the stock at and adjacent to the location of the heel breast line of the shoe.

76. A machine for use in making shoes, having substantially unyielding means formed to cover a small portion of the length of a welted shoe, and means to actuate it for tightening and leveling the shoe stock of the inseam on the two sides of a shoe at and adjacent to the location of the heel breast line of the shoe.

77. A machine for use in making shoes, having automatically operating means for forcing inwardly over the last bottom, compressing and securing the shoe stock of the inseam on the two sides of the shoe simultaneously at and adjacent to the location of the heel breast line of the shoe.

78. In a machine of the class described, the combination with suitable actuating mechanism, of a shoe support, and means coöperating therewith to compress and level the shoe stock of the end portions of the inseam at and adjacent to the heel breast line of the shoe, said machine having means to position the shoe with the inseam ends in appropriate relation to said last named means to receive the action thereof.

79. A machine of the class described, having means for engaging a lasted and welted Goodyear welt shoe below the welt for tightening the upper over the last, means for securing the upper, and means for actuating the forcing means and causing the actuation of the securing means, said machine having provision for effecting an additional movement of the forcing means when the securing means is caused to operate.

80. A machine of the class described, having means for forcing an upper over a last, power driven mechanism for securing the upper, and means under control of the operator for actuating the forcing means and starting said power driven mechanism, said machine having provision for causing a further pressure by the power upon the forcing means when the securing means is operated.

81. A machine for use in making shoes having a presser to tighten an upper over a last, a wiper, means for relatively actuating the wiper and last to compress the stock between them, and means for retracting the presser in predetermined time relation to the compressing movement.

82. A machine for use in making shoes having means for pressing the upper over a last, means for compressing the upper upon the last bottom, and means for automatically withdrawing the first mentioned means during the operation of the compressing means.

83. A machine for use in making shoes having a presser, manually operated means for advancing the presser over the shoe bottom and power operated means for retracting the presser.

84. A machine for use in making shoes having a presser, manually operated means for advancing the presser over the shoe bottom, a yielding connection between the presser and said means, and automatically operated mechanism for retracting the presser with relation to its manually operating means.

85. A machine for use in making shoes having a presser, a tacker, means for advancing the presser, means for actuating the tacker and connections for retracting the presser during the tack driving operation.

86. A machine for use in making shoes having devices for working an upper over the edge of a last, means for driving tacks to secure the upper and mechanism for automatically actuating the tack driving means and moving the overworking devices in a direction reverse to their overworking movement preliminary to the insertion of the tacks.

87. A machine for use in making shoes having, in combination, devices which clasp the heel portion of a shoe and force the upper materials to the last at the sides of the heel and over the last bottom, means for inserting fastenings to secure the upper in such condition, power driving mechanism for said means, a manually operated treadle and connections for so actuating said devices to clasp the heel and to force the upper over the last bottom and thereafter connecting said fastening means to its power driving mechanism.

88. A machine for working upon a lasted and welted shoe, comprising means for engaging the shoe stock to tighten the upper over the edge of the last at the rear end of the inseam, means for leveling the rear end portion of the inseam, and means for securing the rear end portion of the welt.

89. A machine of the class described, having means for engaging a lasted and welted shoe to tighten the upper inwardly over the edge of the last at the rear end of the inseam, means to secure the upper, and means including a support for the shoe to compress the stock upon the last bottom at the rear end of the inseam.

90. A machine of the class described, having in combination, a shoe support or holder, means for working into lasted position the upper of a welted shoe adjacent to the end of the inseam, said means being constructed and arranged to engage the shoe between the upper and welt to tighten the upper about the last, and means for securing the upper while it is held in tightened condition.

91. A machine of the class described having, in combination, short thin blades or plates arranged to act locally at the front end of the heel seat of a shoe to force the upper and the flange of the heel stiffener ends into lasted relation to the innersole lip, and means for actuating said plates at the two sides of the shoe simultaneously in opposite directions transversely of the shoe and without substantial movement lengthwise of the shoe.

92. A machine of the class described having, in combination, plates to engage an upper at the opposite sides of a shoe to tighten it over the last edge toward the lip of the innersole, means arranged to clamp the stock from above to hold it from retraction until it is fastened while the plates are withdrawn, said machine being arranged for withdrawal of said plates prior to the fastening of the upper.

93. A machine of the class described having, in combination, wiper plates to tighten an upper over the edge of a last, mechanism to apply fastenings to secure the upper, means for relatively moving the shoe and a member that is associated with said fastening applying mechanism to compress and flatten the stock upon the last bottom, and means for withdrawing the wiper plates while the upper is held by said mechanism and before the application of the flattening compression.

94. A machine of the class described having, in combination, wiper plates to tighten an upper over the edge of a last, means for manually operating said plates, upper securing mechanism, and means for automatically retracting the wiper plates in time relation to the operation of the securing mechanism.

95. A machine of the class described having, in combination, opposed wiper plates 50, connections to a manually operated device for actuating them, a power driven tacker and heel seat compressor, and means for retracting the wiper plates in time relation to the operation of the tacker and compressor.

96. A machine of the class described having, in combination, a wiper plate to tighten an upper over the edge of a last, and a member arranged to engage the upper in advance of the edge of the wiper and hold it in tightened condition, and mechanism to retract the wiper and insert securing tacks while the upper is so held.

97. A machine of the class described having, in combination, a wiper plate to tighten an upper over the edge of a last and a member arranged in a plane above the wiper and with relation to which there is relative inward and outward movement and which is adapted to engage the upper in advance of the acting edge of the wiper and hold it while the wiper is retracted.

98. A machine of the class herein described having, in combination, means for supporting a lasted and welted shoe, means arranged to engage in the crease between the upper and the welt adjacent to its end to tighten the upper, and means to fasten the upper.

In testimony whereof I have signed my name to this specification in the presence of two subscribing witnesses.

EUGENE L. KEYES.

Witnesses:
ARTHUR L. RUSSELL,
BERTHA M. HUTCHINSON.

---

Copies of this patent may be obtained for five cents each, by addressing the "Commissioner of Patents, Washington, D. C."

Correction in Letters Patent No. 1,023,854.

It is hereby certified that in Letters Patent No. 1,023,854, granted April 23, 1912, upon the application of Eugene L. Keyes, of Boston, Massachusetts, for an improvement in "Machines for Use in the Manufacture of Shoes," an error appears in the printed specification requiring correction as follows: Page 10, line 103, for the word "seams" read *means;* and that the said Letters Patent should be read with this correction therein that the same may conform to the record of the case in the Patent Office.

Signed and sealed this 21st day of May, A. D., 1912.

[SEAL.]

C. C. BILLINGS,
*Acting Commissioner of Patents.*